United States Patent
Kamada

(10) Patent No.: US 8,641,151 B2
(45) Date of Patent: Feb. 4, 2014

(54) SPROCKET SUPPORT STRUCTURE

(75) Inventor: Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 567 days.

(21) Appl. No.: 12/945,560

(22) Filed: Nov. 12, 2010

(65) Prior Publication Data

US 2012/0119565 A1    May 17, 2012

(51) Int. Cl.
   *B62M 9/125*    (2010.01)
(52) U.S. Cl.
   USPC .......................................... 301/110.5; 192/64
(58) Field of Classification Search
   USPC ......... 301/110.5; 192/64, 110 B, 46; 474/160
   See application file for complete search history.

(56) References Cited

U.S. PATENT DOCUMENTS

| | | | | |
|---|---|---|---|---|
| 4,674,617 | A * | 6/1987 | Nagano | 192/113.32 |
| 5,458,223 | A * | 10/1995 | Chen | 192/64 |
| 5,480,357 | A | 1/1996 | Liang | |
| 5,492,211 | A * | 2/1996 | Wu | 192/115 |
| 5,513,733 | A | 5/1996 | Fu | |
| 5,738,197 | A | 4/1998 | Kroger et al. | |
| 6,039,665 | A | 3/2000 | Nakamura | |
| 6,244,405 | B1 * | 6/2001 | Chen | 192/64 |
| 6,409,281 | B1 | 6/2002 | Kanehisa et al. | |
| 6,428,437 | B1 * | 8/2002 | Schlanger | 474/160 |
| 7,351,171 | B2 | 4/2008 | Kanehisa et al. | |
| 7,435,197 | B2 | 10/2008 | Kamada | |
| 8,312,976 | B2 * | 11/2012 | French | 192/64 |
| 2002/0070604 | A1 * | 6/2002 | Kanehisa | 301/110.5 |
| 2006/0231366 | A1 * | 10/2006 | Meggiolan | 192/64 |
| 2006/0258499 | A1 * | 11/2006 | Kamada | 474/160 |
| 2007/0034474 | A1 | 2/2007 | Lew et al. | |
| 2008/0004143 | A1 * | 1/2008 | Kanehisa et al. | 474/160 |
| 2008/0234082 | A1 * | 9/2008 | Braedt | 474/116 |
| 2010/0252389 | A1 * | 10/2010 | French | 192/64 |
| 2011/0220449 | A1 * | 9/2011 | Chiang | 192/64 |

FOREIGN PATENT DOCUMENTS

| | | |
|---|---|---|
| DE | 10 2004-045 419 A1 | 3/2006 |
| EP | 1 495 879 A2 | 1/2005 |

OTHER PUBLICATIONS

European Search Report of corresponding EP Application No. 11 17 0099.3 dated Dec. 5, 2011.

* cited by examiner

*Primary Examiner* — Kip T Kotter
(74) *Attorney, Agent, or Firm* — Global IP Counselors

(57) ABSTRACT

A sprocket support structure includes a main body, a plurality of projections and an abutment ring. The main body includes an outer surface with a plurality of parallel extending sprocket attachment splines defining a plurality of sprocket engaging grooves between the sprocket attachment splines. The projections extend radially outward farther than the sprocket attachment splines with respect to a rotation axis of the main body. Each of the projections includes a first surface facing in a first axial direction of the main body. The abutment ring is disposed on the main body as a separate member from the main body. The abutment ring includes a second surface facing in the first axial direction and axially spaced from the first surfaces of the projections with respect to the rotation axis. The second surface of the abutment ring is exposed between the projections as viewed along the sprocket engaging grooves.

21 Claims, 17 Drawing Sheets

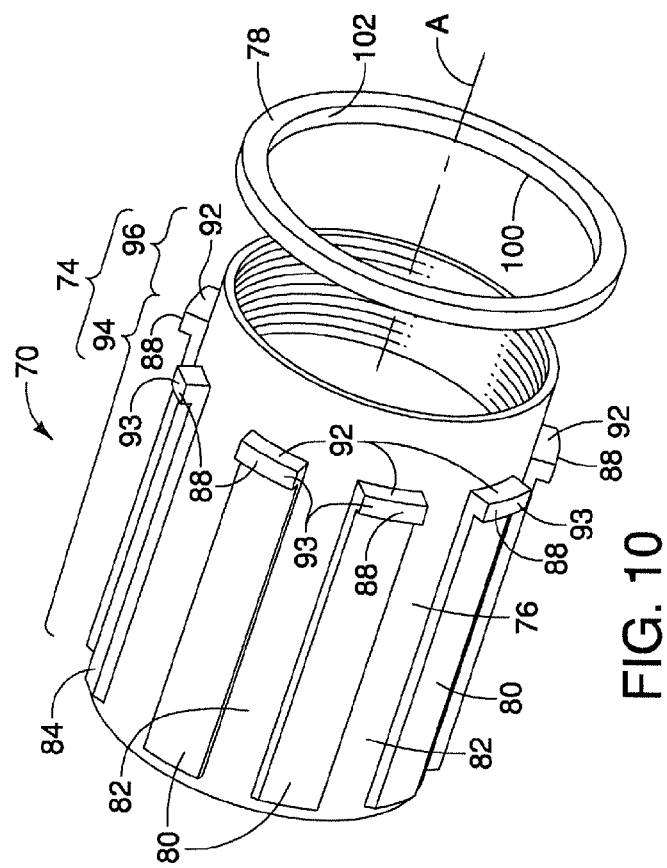
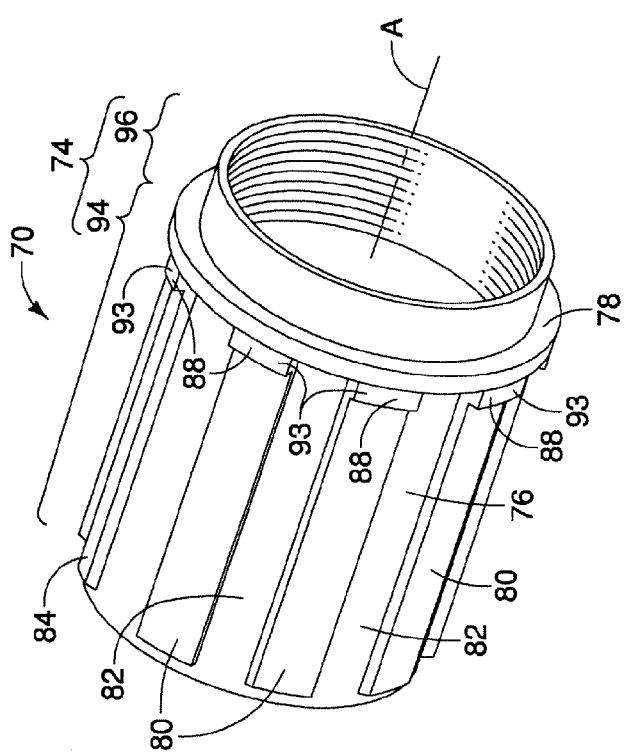

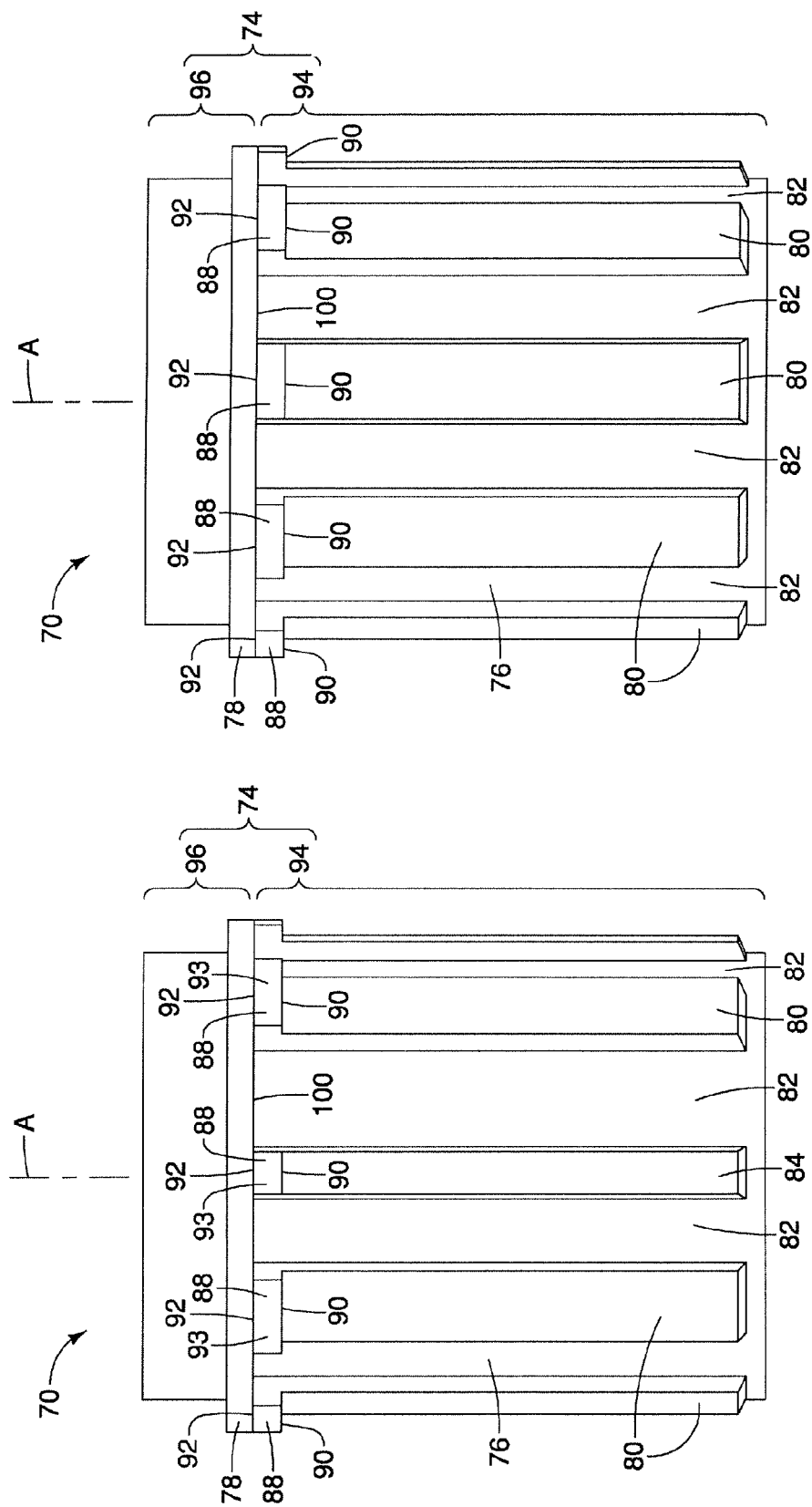

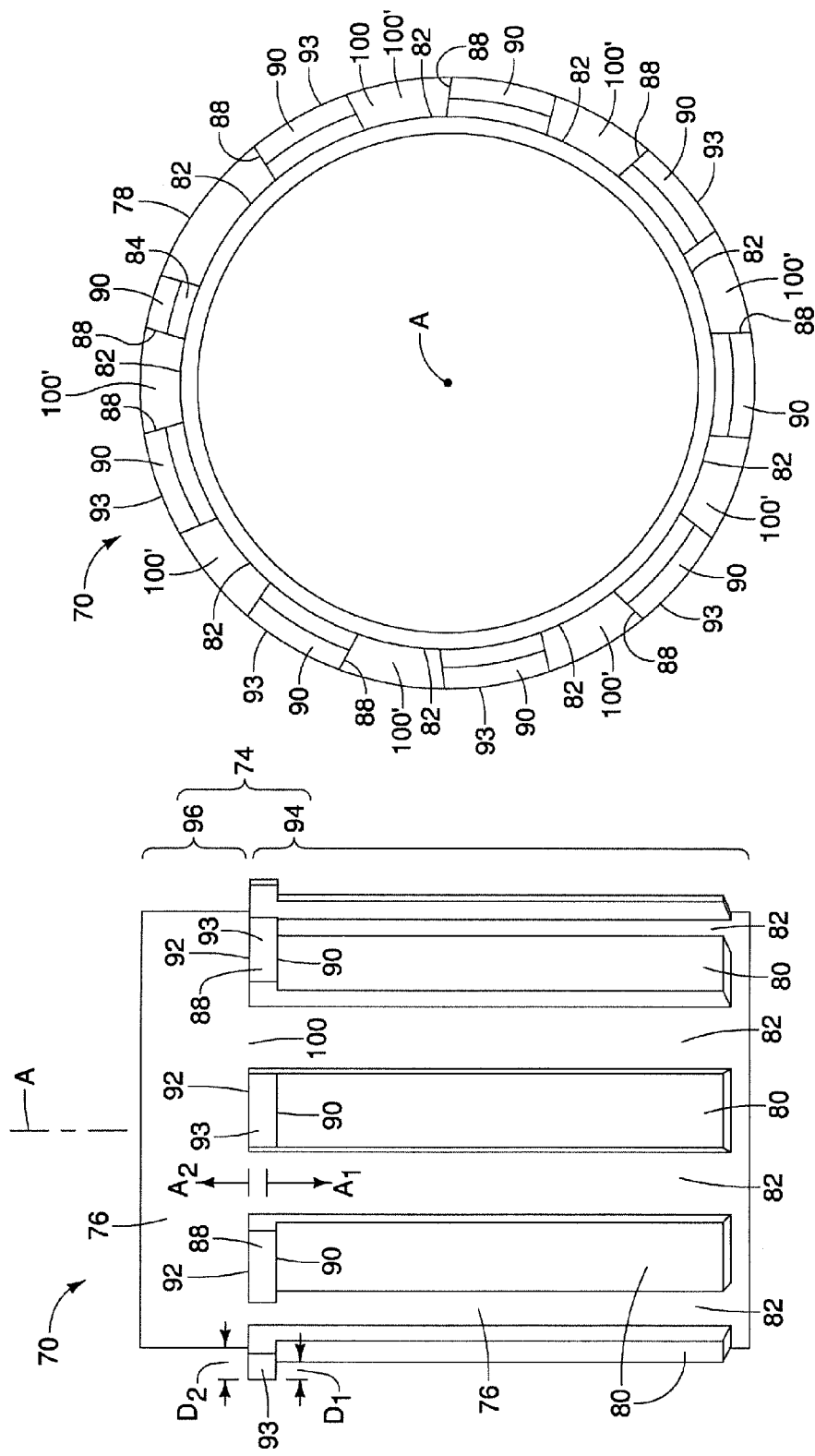

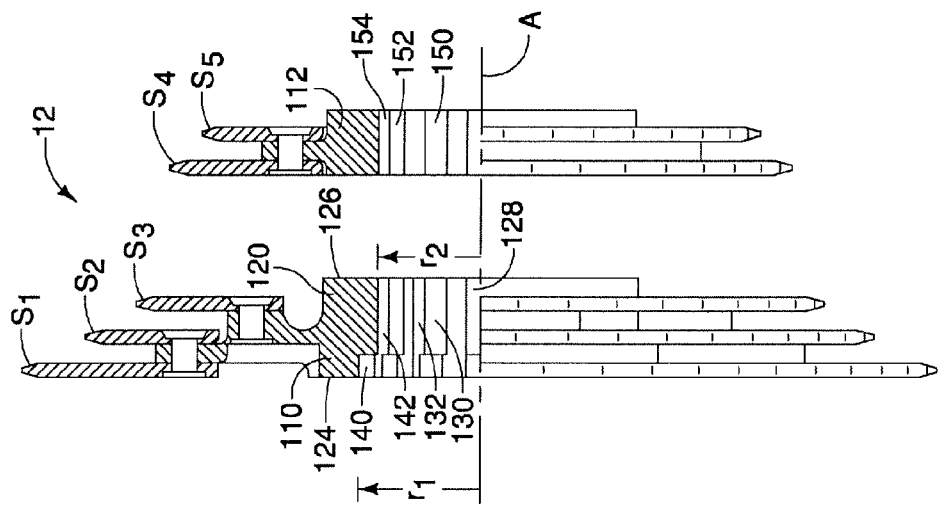
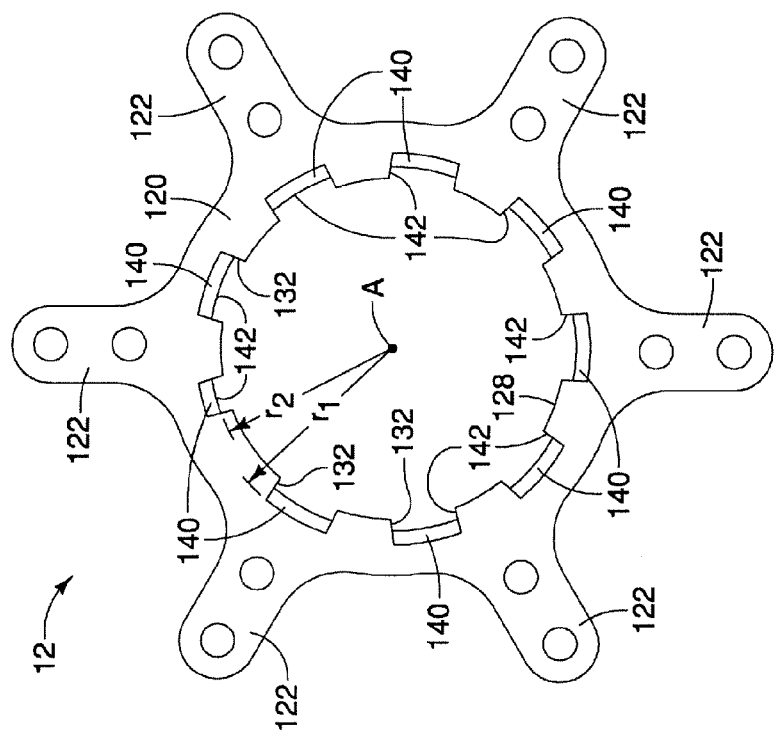
FIG. 19
FIG. 18

SPROCKET SUPPORT STRUCTURE

BACKGROUND

1. Field of the Invention

This invention generally relates to a hub assembly that includes a sprocket support structure. More specifically, the present invention relates to a sprocket support structure that allows for interchangeable installation of any one of a plurality of sprocket cassettes on a hub assembly, where each of the plurality of sprocket cassette includes a differing number and/or combination of individual sprockets.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a hub assembly with a sprocket support structure that can interchangeably receive and support any one of a plurality of sprocket cassettes, each sprocket cassette having differing numbers and/or combinations of sprockets.

In view of the state of the known technology, a sprocket support structure includes a main body, a plurality of projections and an abutment ring. The main body includes an outer surface with a plurality of parallel extending sprocket attachment splines defining a plurality of sprocket engaging grooves between the sprocket attachment splines. The plurality of projections extend radially outward farther than the sprocket attachment splines with respect to a rotation axis of the main body, each of the projections including a first surface facing in a first axial direction of the main body. The abutment ring is disposed on the main body as a separate member from the main body. The abutment ring includes a second surface facing in the first axial direction that is axially spaced from the first surfaces of the projections with respect to the rotation axis. The second surface of the abutment ring is exposed between the projections as viewed along the sprocket engaging grooves.

BRIEF DESCRIPTION OF THE DRAWINGS

Referring now to the attached drawings which form a part of this original disclosure:

FIG. 9 is a perspective view of the freewheel outer of the sprocket support structure removed from the hub assembly showing a plurality of splines having projections and an abutment ring in accordance with the one embodiment;

FIG. 10 is an exploded perspective view of the freewheel outer depicted in FIG. 9, showing the abutment ring separated from the freewheel outer in accordance with the one embodiment;

FIG. 11 is an elevation view of a first side of the freewheel outer showing a first portion of the plurality of splines including a keyway spline, the projections and the abutment ring in accordance with the one embodiment;

FIG. 12 is an elevation view of a second side of the freewheel outer showing a second portion of the plurality of splines, the projections and the abutment ring in accordance with the one embodiment;

FIG. 13 is another elevational view of a second side of the freewheel outer showing the freewheel outer with the abutment ring removed in accordance with the one embodiment;

FIG. 14 is an end elevational view of the freewheel outer showing the splines, the keyway spline, the projections and the abutment ring in accordance with the one embodiment;

FIG. 18 is an elevational view of the first sprocket support member of the sprocket cassette with eleven (11) sprockets with the three sprockets removed showing a freewheel engaging portion and a sprocket engaging portion in accordance with the one embodiment;

FIG. 19 is a cross-sectional view of the first sprocket support member and the second spider, showing inner slots of the freewheel engaging portions of the first sprocket support member and the second spider in accordance with the one embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
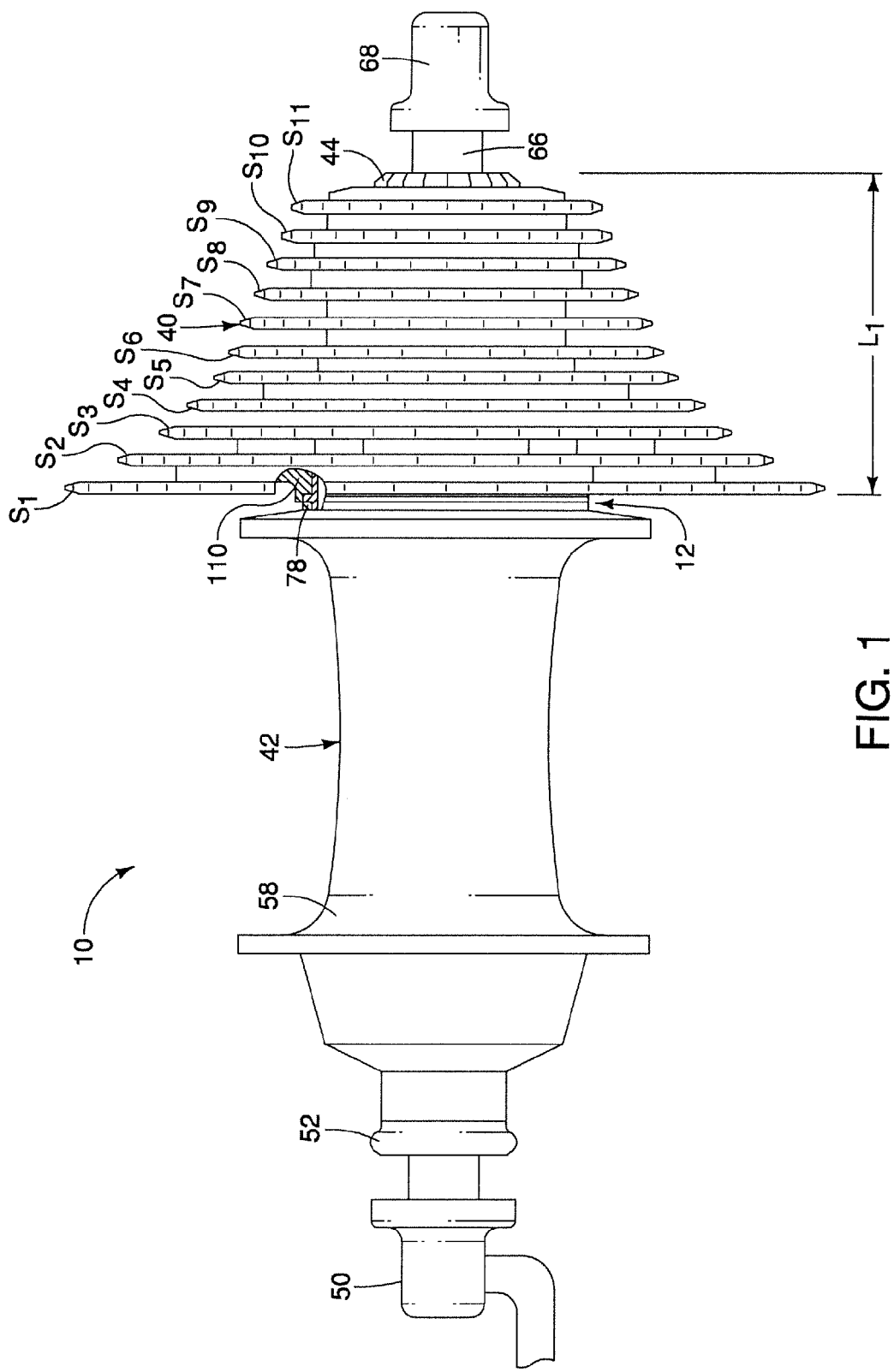
FIG. 1 is an elevation view of a hub assembly with a sprocket cassette with eleven (11) sprockets installed on the hub assembly, the hub assembly including a sprocket support structure in accordance with the one embodiment.

Referring initially to FIG. 1, a bicycle drive assembly 10 is illustrated with a sprocket support structure 12 in accordance with a first embodiment. The sprocket support structure 12 is dimensioned to interchangeably include any one of several differing multi-stage sprocket cassettes, each sprocket cassette having a different of number and/or combination of sprockets.

As shown in FIG. 1, the bicycle drive assembly 10 includes a sprocket cassette 40 and a hub assembly 42, where the sprocket cassette 40 is installed on the hub assembly 42. The sprocket support structure 12 is defined primarily by features of the hub assembly 42 and features of the sprocket cassette 40 that engage the features of the hub assembly 42.

Figure 2:
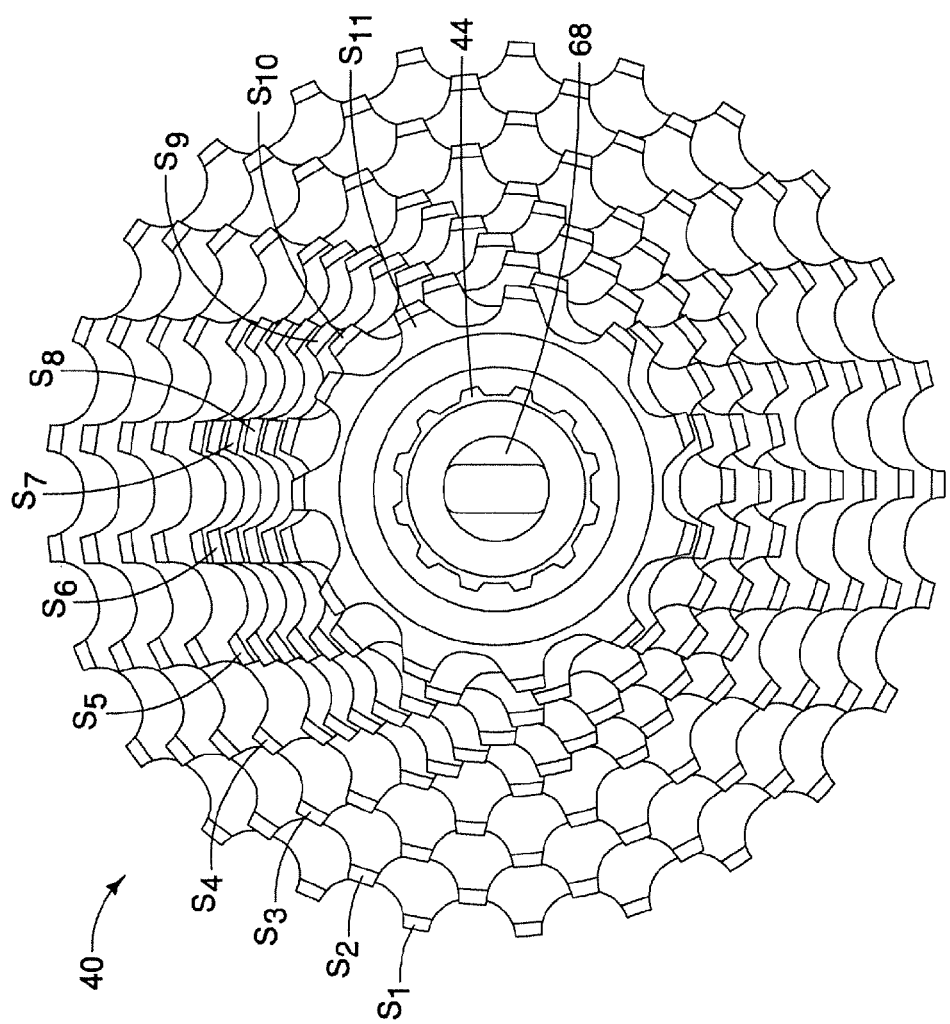
FIG. 2 is an end view of the hub assembly and the sprocket cassette with eleven (11) sprockets depicted in FIG. 1, showing engagement between the hub assembly and the sprocket cassette in accordance with the one embodiment.
Figure 3:
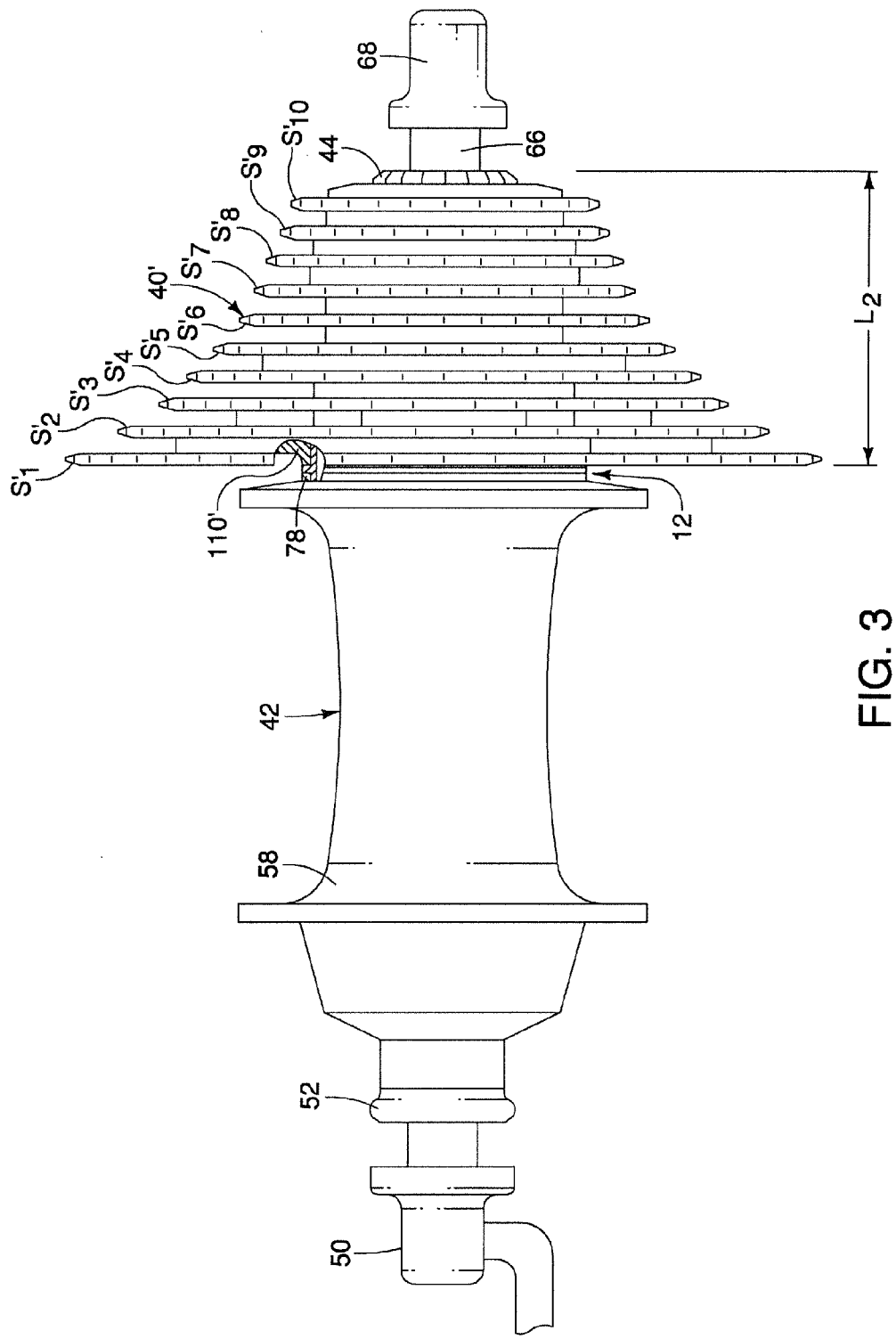
FIG. 3 is another elevation view of the hub assembly with a sprocket cassette with ten (10) sprockets installed on the sprocket support structure of the hub assembly in accordance with the one embodiment.
Figure 4:
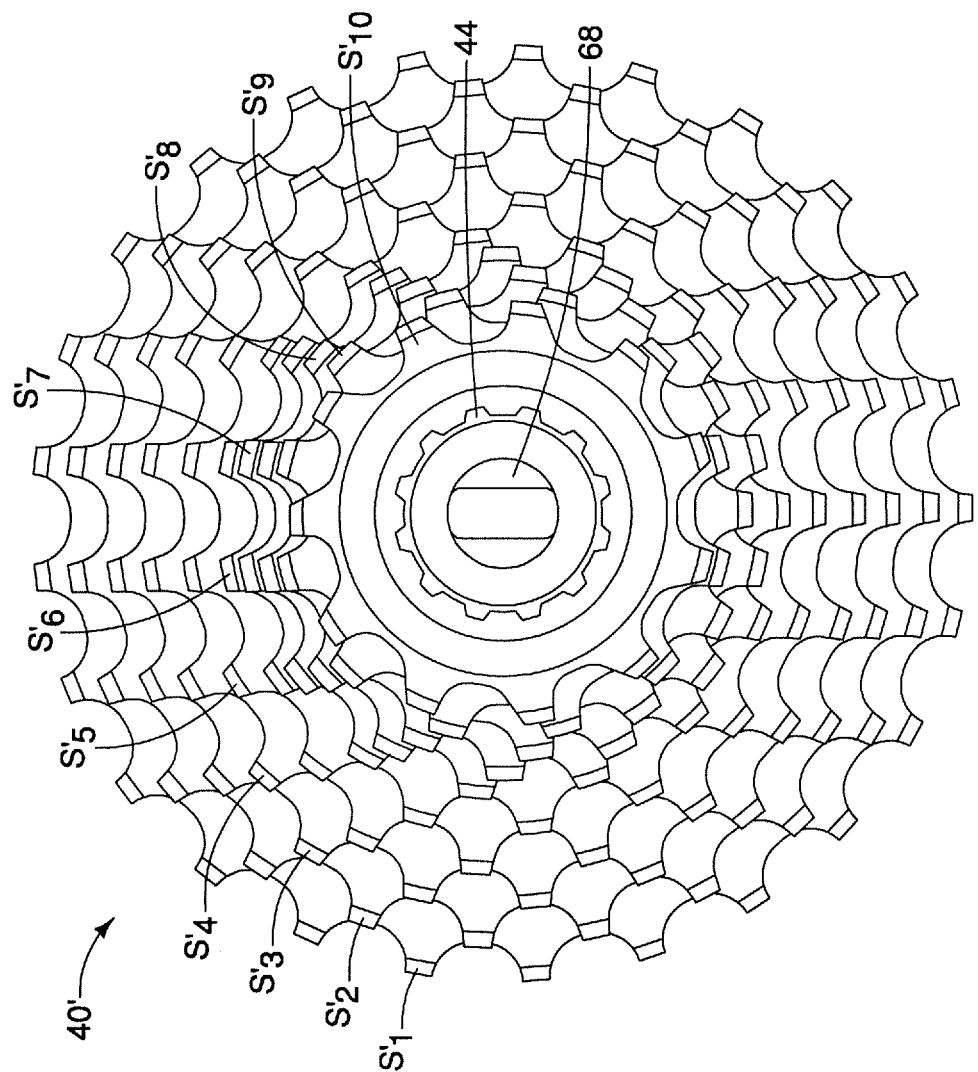
FIG. 4 is an end view of the hub assembly and the sprocket cassette with ten (10) sprockets depicted in FIG. 3, showing engagement between the hub assembly and the sprocket cassette in accordance with the one embodiment.
Figure 5:
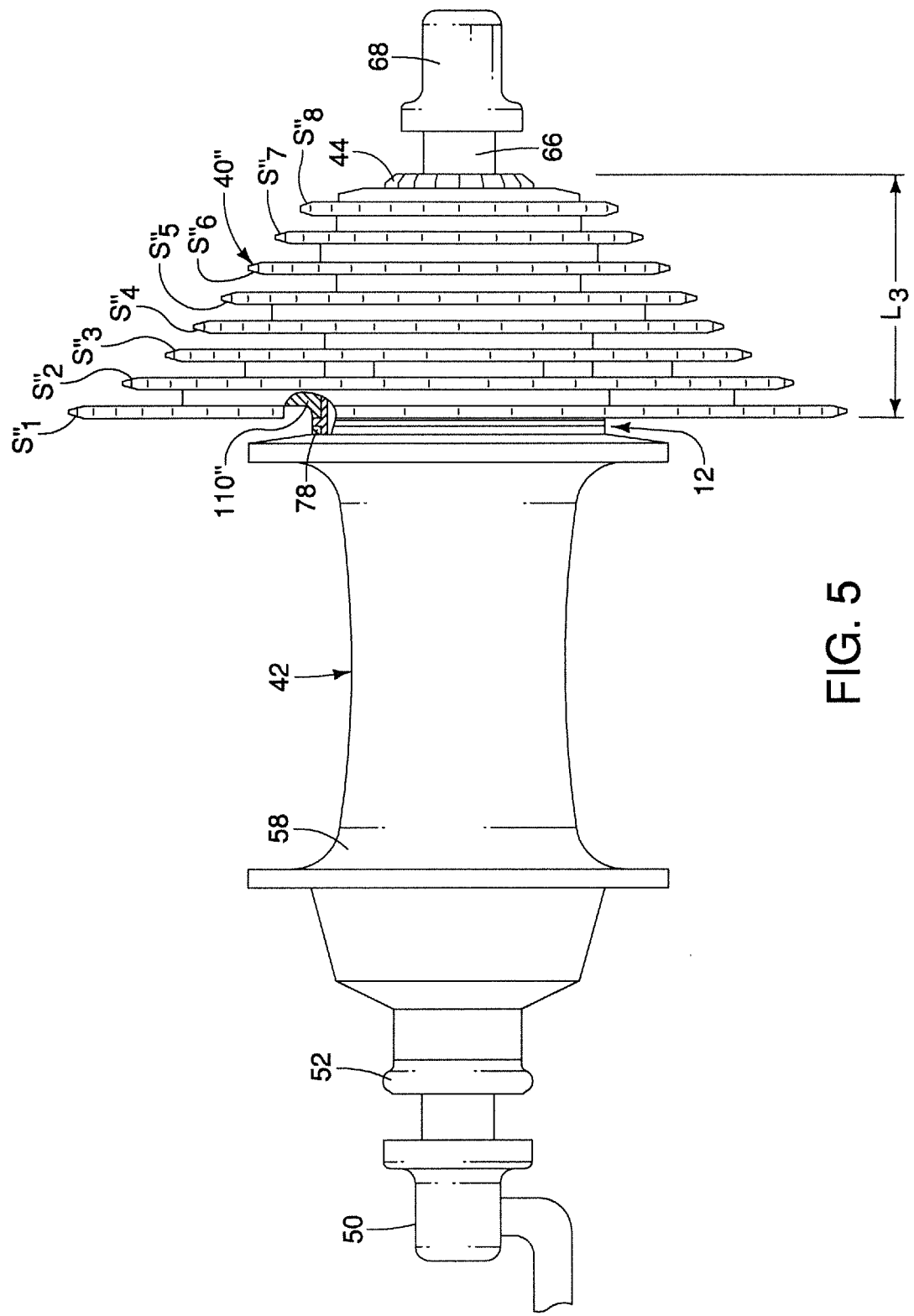
FIG. 5 is another elevation view of the hub assembly with a sprocket cassette with eight (8) sprockets installed on the sprocket support structure of the hub assembly in accordance with the one embodiment.
Figure 6:
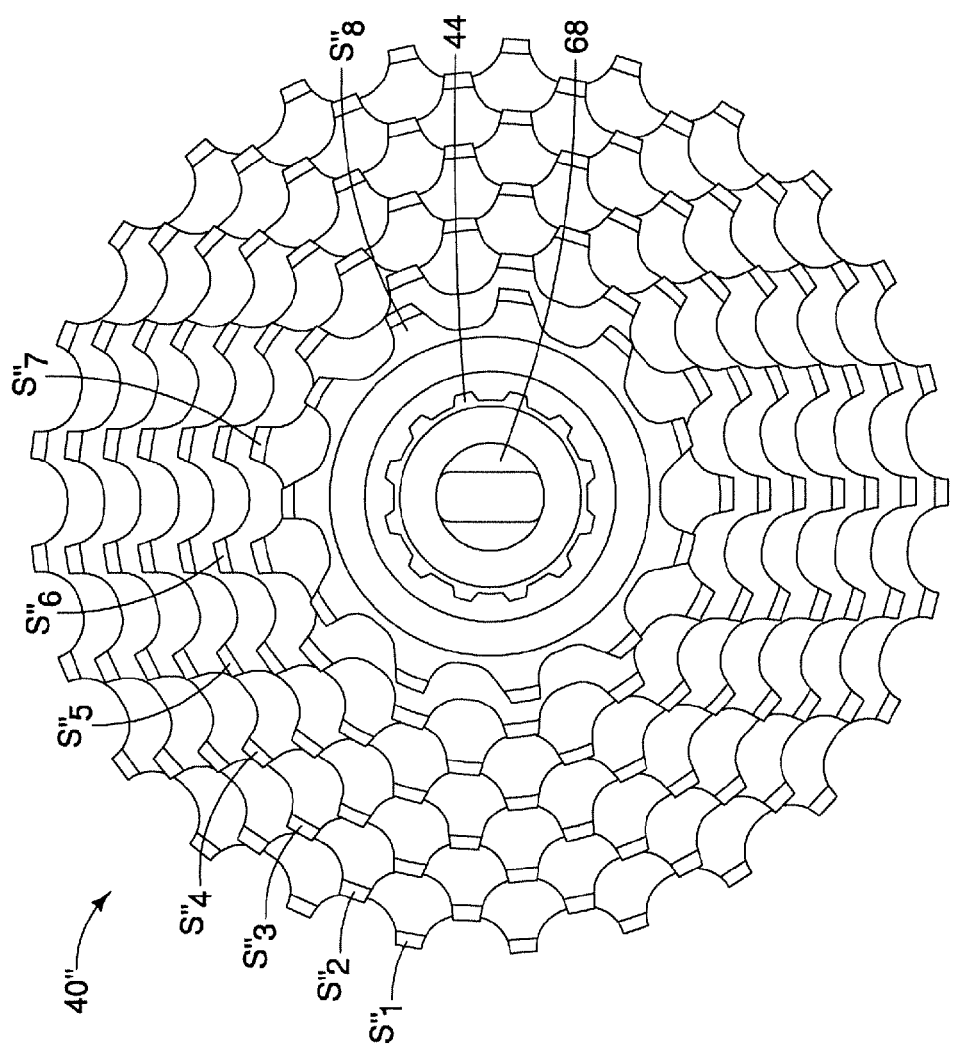
FIG. 6 is an end view of the hub assembly and the sprocket cassette with eight (8) sprockets depicted in FIG. 5, showing engagement between the hub assembly and the sprocket cassette in accordance with the one embodiment.

The hub assembly 42 is configured to interchangeably receive and support any one of several differing multi-stage sprocket cassettes, such as the sprocket cassette 40 depicted in FIGS. 1-2, a sprocket cassette 40' depicted in FIGS. 3 and 4 and a sprocket cassette 40" depicted in FIGS. 5 and 6. More specifically, the hub assembly 42 can receive and support any one of several different sprocket cassettes 40, 40' or 40" without modification or change to the hub assembly 42 itself. As will be understood from the description below, any of the depicted sprocket cassettes, or other sprocket cassettes with differing sprocket combinations can be interchangeably installed onto the hub assembly 42 without modification or change to the hub assembly 42.

Figure 17:
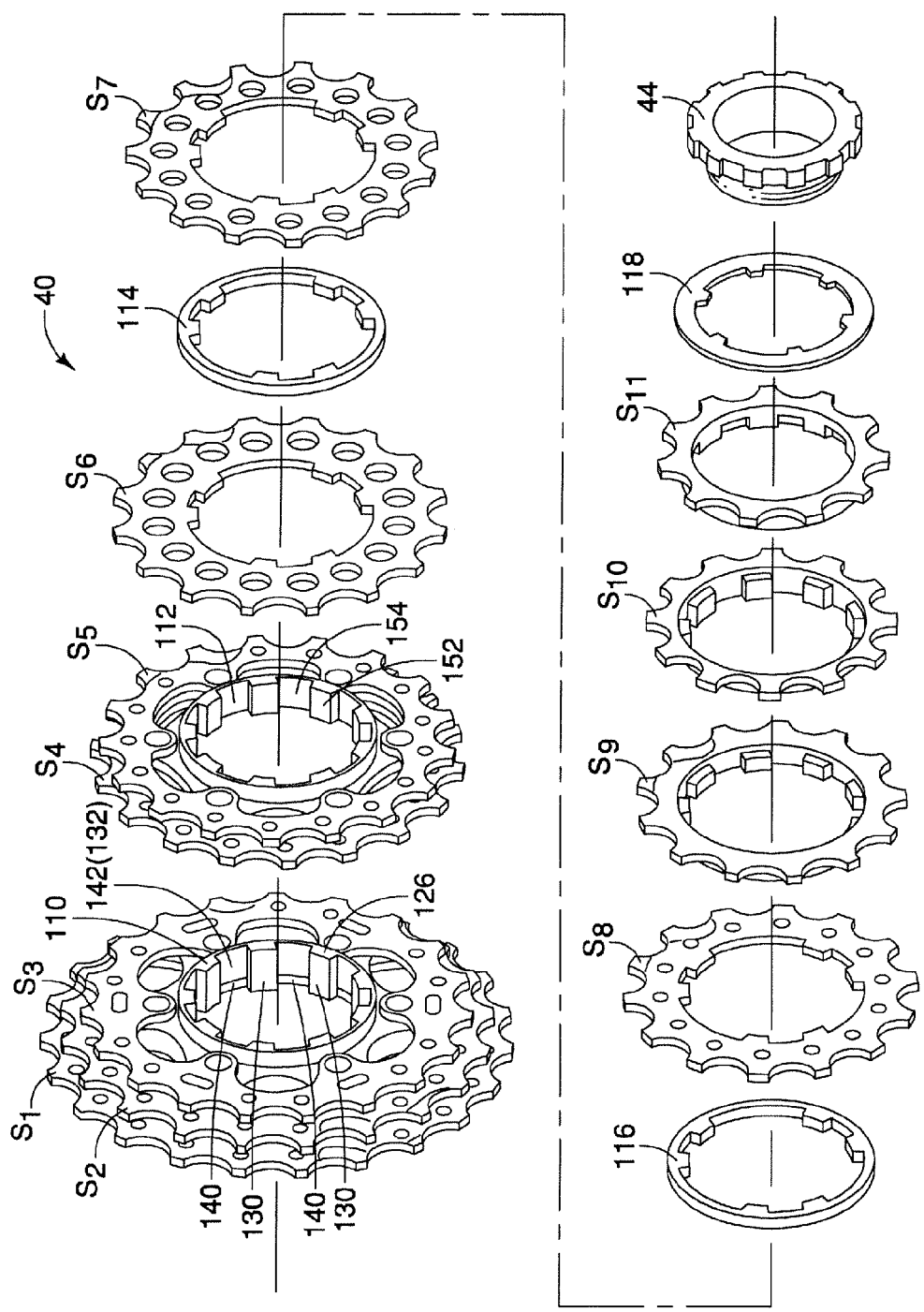
FIG. 17 is an exploded view of the sprocket cassette with eleven (11) sprockets showing the first sprocket support member and three sprockets supported thereon and a second spider with two sprockets supported thereon in accordance with the one embodiment.
Figure 21:
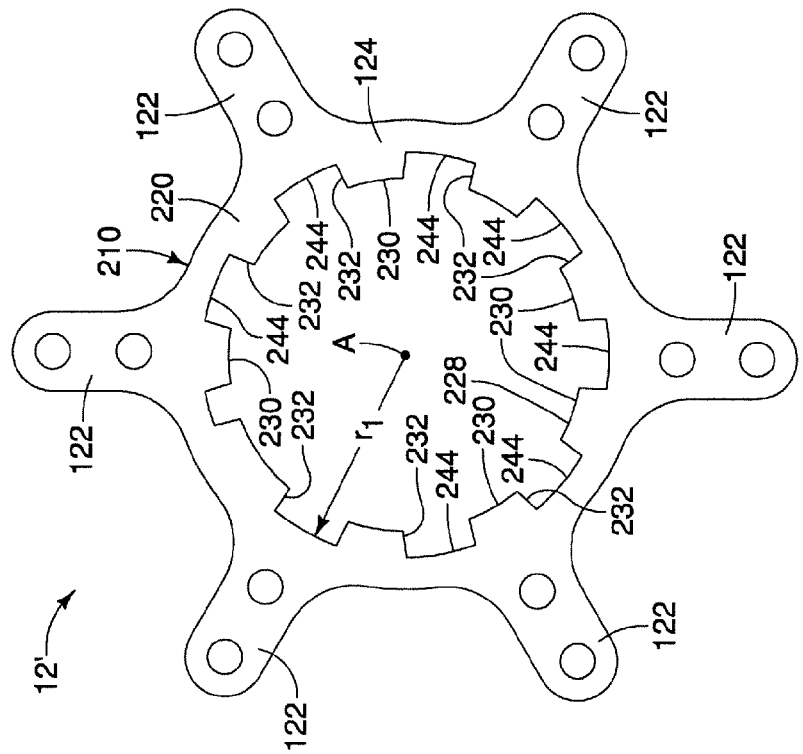
FIG. 21 is an elevational view of a first sprocket support member of the sprocket cassette with eleven (11) sprockets with the sprockets removed showing a freewheel engaging portion and a sprocket engaging portion in accordance with a second embodiment of the sprocket support structure.

As shown in FIGS. 1 and 2, the sprocket cassette 40 can be installed on the hub assembly 42. The sprocket cassette 40 includes eleven (11) sprockets installed on the sprocket support structure 12 of the hub assembly 42. Specifically, the sprocket cassette 40 includes a first sprocket $S_1$ having 25 gear teeth, a second sprocket $S_2$ having 23 gear teeth, a third sprocket $S_3$ having 21 gear teeth, a fourth sprocket $S_4$ having 19 gear teeth, a fifth sprocket $S_5$ having 17 gear teeth, a sixth sprocket $S_6$ having 16 gear teeth, a seventh sprocket $S_7$ having 15 gear teeth, an eighth sprocket $S_8$ having 14 gear teeth, a ninth sprocket $S_9$ having 13 gear teeth, a tenth sprocket $S_{10}$ having 12 gear teeth and an eleventh sprocket $S_{11}$ having 11 gear teeth. The sprocket cassette 40 also includes a locking ring 44. As shown in FIG. 1, the sprocket cassette 40 has an overall axial length $L_1$. The sprocket cassette 40 is also depicted in FIG. 17 with features of the sprocket cassette 40 described in greater detail below.

As indicated in FIGS. 3 and 4, the sprocket cassette 40 can be removed and replaced with the sprocket cassette 40' with ten (10) sprockets with no modifications to the hub assembly 42. The sprocket cassette 40' includes a first sprocket $S'_1$ having 25 gear teeth, a second sprocket $S'_2$ having 23 gear teeth, a third sprocket $S'_3$ having 21 gear teeth, a fourth sprocket $S'_4$ having 19 gear teeth, a fifth sprocket $S'_5$ having 17 gear teeth, a sixth sprocket $S'_6$ having 15 gear teeth, a seventh sprocket $S'_7$ having 14 gear teeth, an eighth sprocket $S'_8$ having 13 gear teeth, a ninth sprocket $S'_9$ having 12 gear teeth and a tenth sprocket $S'_{10}$ having 11 gear teeth. The sprocket cassette 40' also includes the locking ring 44. As shown in FIG. 3, the sprocket cassette 40' has an overall axial length $L_2$.

As shown in FIGS. 5 and 6, the sprocket cassette 40 can also be removed and replaced with the sprocket cassette 40" with eight (8) sprockets with no modifications to the hub assembly 42 or the sprocket support structure 12. The sprocket cassette 40" includes: a first sprocket $S''_1$ having 25 gear teeth, a second sprocket $S''_2$ having 23 gear teeth, a third sprocket $S''_3$ having 21 gear teeth, a fourth sprocket $S''_4$ having 19 gear teeth, a fifth sprocket $S''_5$ having 17 gear teeth, a sixth sprocket $S''_6$ having 15 gear teeth, a seventh sprocket $S''_7$ having 13 gear teeth and an eighth sprocket $S''_8$ having 11 gear teeth. The sprocket cassette 40" also includes the locking ring 44. As shown in FIG. 5, the sprocket cassette 40" has an overall axial length $L_3$.

The overall length $L_1$ of the sprocket cassette 40 is greater than the overall lengths $L_2$ and $L_3$ of the sprocket cassettes 40' and 40".

Figure 7:
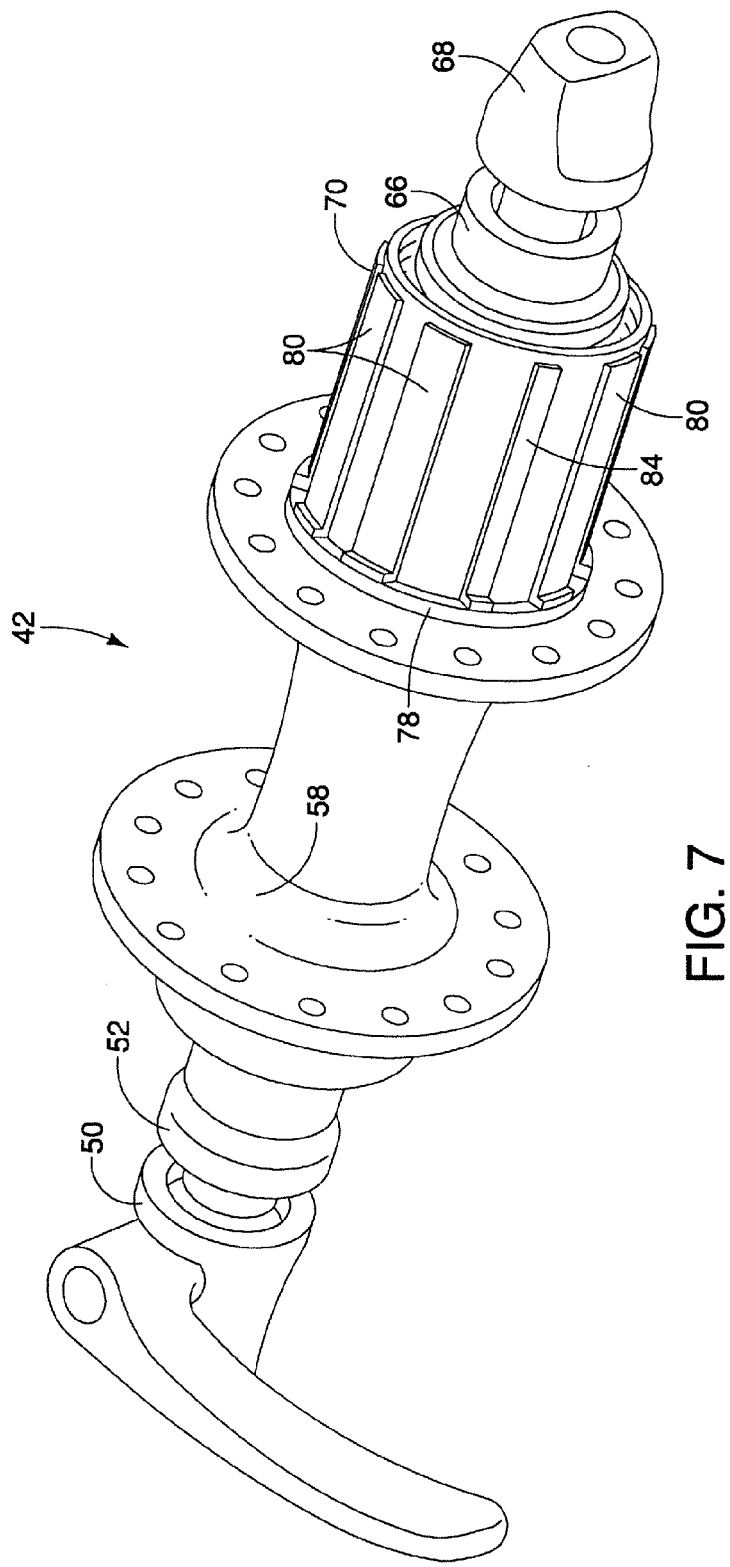
FIG. 7 is a perspective view of the hub assembly with the sprocket cassette removed exposing a freewheel outer of the sprocket support structure in accordance with the one embodiment.
Figure 8:
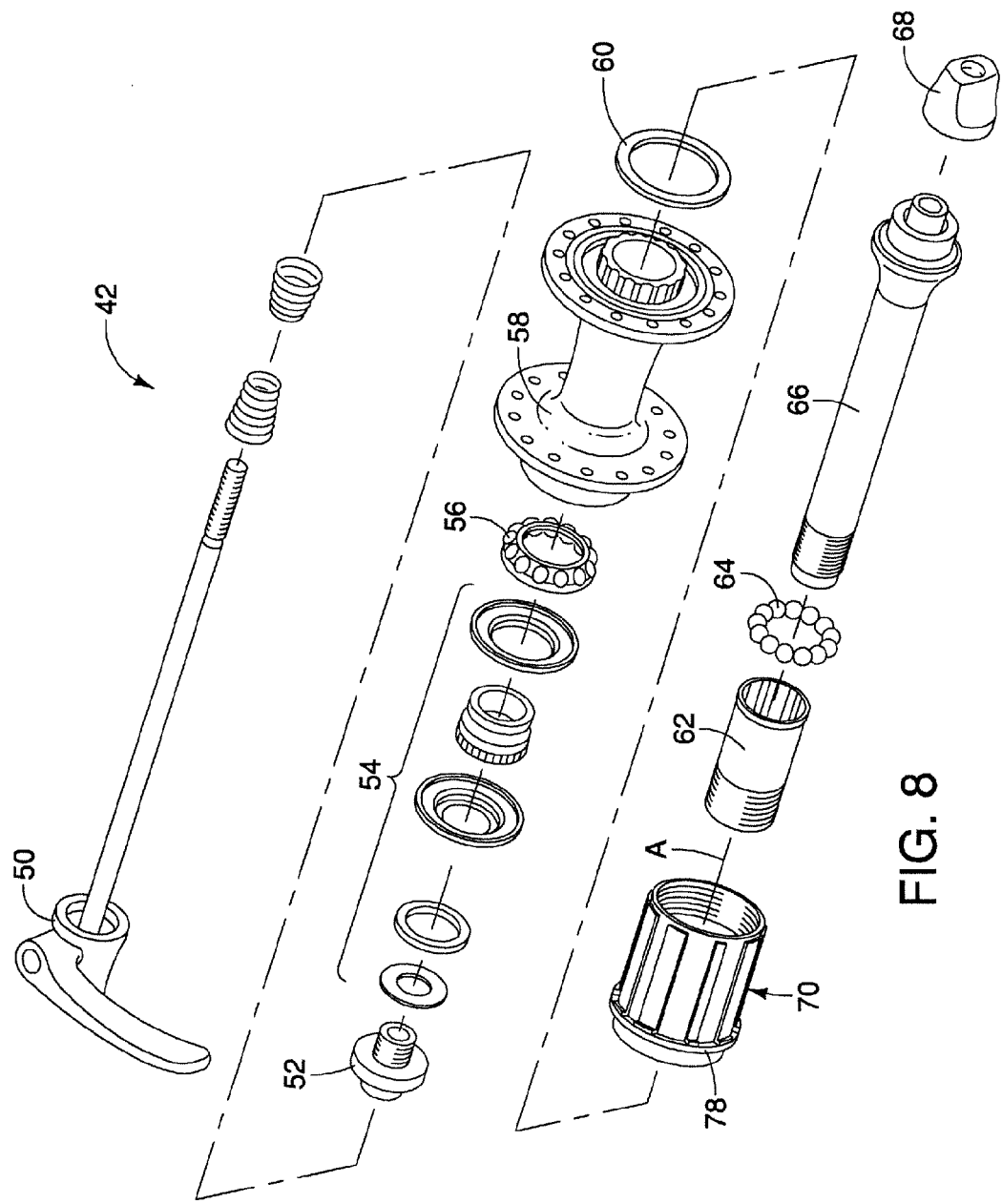
FIG. 8 is a perspective exploded view of the hub assembly showing various elements of the hub assembly including the freewheel outer of the sprocket support structure in accordance with the one embodiment.

As best shown in FIGS. 7 and 8, the hub assembly 42 basically includes a quick release 50, a lock nut 52, a seal and cap assembly 54, a first bearing 56, a hub body 58, a seal 60, an outer shaft 62, a second bearing 64, hub axle 66, an end cap 68 and a freewheel outer 70. The hub body 58 is rotatably disposed on the hub axle 66. The quick release 50, the lock nut 52, the seal and cap assembly 54, the first bearing 56, the hub body 58, the seal 60, the outer shaft 62, the second bearing 64, the hub axle 66 and the end cap 68 are all conventional. Therefore, further description of these elements is omitted for the sake of brevity.

The sprocket support structure 12 is defined by features of the freewheel outer 70 and features of the sprocket cassette 40, the sprocket cassette 40' and the sprocket cassette 40", as described below.

As indicated in FIGS. 7 and 8, the freewheel outer 70 is rotatably disposed on the hub axle 66 for rotation with the hub body 58 in one direction about the hub axle 66. More specifically, the hub assembly 42 includes a conventional pawl and/or one-way clutch mechanism (not shown) that mechanically connects the freewheel outer 70 and the hub body 58 such that rotation of the freewheel outer 70 in a first rotation direction causes the freewheel outer 70 and the hub body 58 to rotate together. In this instance, torque is typically transmitted from the freewheel outer 70 to the hub body 58 and a rear wheel (not shown) in a conventional manner. When the freewheel outer 70 rotates in an opposite second rotation direction, the freewheel outer 70 and the hub body 58 are not mechanically coupled to one another. The pawl and/or one-way clutch mechanism (not shown) is disposed within the freewheel outer 70 and is therefore concealed. Since pawls and one-way clutch mechanism are conventional mechanical features, further description thereof is omitted for the sake of brevity.

As best shown in FIGS. 9-14, the freewheel outer 70 basically includes a main body 74 with an outer surface 76 and an abutment ring 78. The outer surface 76 of the main body 74 includes a plurality of parallel extending sprocket attachment splines 80 that define a plurality of sprocket engaging grooves 82 between the sprocket attachment splines 80. The sprocket attachment splines 80 extend in directions that are parallel to a rotation axis A defined by the main body 74.

One of the sprocket attachment splines 80 is a keyway 84. The sprocket attachment splines 80 are equally circumferentially spaced apart from one another, except for the keyway 84, as shown in FIGS. 11 and 14. The spacing of the sprocket attachment splines 80 and the keyway 84 are conventional. The sprocket cassettes 40, 40' and 40" have inner splines and grooves with corresponding circumferential spacing and keyway dimensions that are also conventional. Since the circumferential spacing of the sprocket attachment splines 80 and the keyway 84 are conventional features, further description is omitted for the sake of brevity.

Each of the sprocket attachment splines 80, including the keyway 84, includes a radially outwardly extending projection 88, defining a plurality of the projections 88. The projections 88 extend radially outward farther than the sprocket attachment splines 80 with respect to the rotation axis A of the main body 74.

Each projection 88 includes a first surface 90 and a second surface 92 that extend radially outwardly in directions perpendicular to the rotational axis A. Each projection 88 also includes an outermost surface 93. Further, as indicated in FIG. 13, the first surfaces 90 face a first axial direction $A_1$. More specifically, the first surfaces 90 are perpendicular to the first axial direction $A_1$. Further, the first axial direction $A_1$ is parallel to the rotational axis A. The second surfaces 92 face a second axial direction $A_2$. Further, the second surfaces 92 are perpendicular to the second axial direction $A_2$ and the second axial direction $A_2$ is parallel to the rotational axis A. The second axial direction $A_2$ extends in a direction opposite the first axial direction $A_1$. As indicated at the left side of FIG. 13, the first surface 90 extends radially outward along the projection 88 between the sprocket attachment splines 80 and the outermost surfaces 93 a first distance $D_1$. The second surface 92 extends from the outer surface 76 to the outermost surfaces 93 a second distance $D_2$, where $D_2$ is larger than $D_1$.

As indicated in FIG. 13, the main body 74 (and the outer surface 76) is basically divided into a first portion 94 and a second portion 96. The first portion 94 is defined as the section of the main body 74 that extends from the second surfaces 92 in the first axial direction $A_1$. Consequently, the sprockets attachment splines 80 and sprocket engaging grooves 82 extend along the first portion 94. Further, the second portion 96 is defined as the section of the main body 74 that extends from the second surface 92 in the second axial direction $A_2$.

In the depicted embodiment, the abutment ring 78 is a separate member from the main body 74. The abutment ring 78 is disposed on the second portion 96 of the main body 74 adjacent to the second surfaces 92 of the projections 88. The abutment ring 78 includes an annular third surface 100 and a circular bore 102 (shown in FIG. 10). The third surface 100 faces the second surfaces 92, as indicated in FIGS. 1 and 12. The third surface 100 is spaced apart in an axial direction from the first surfaces 90 of the projections 88, as also indicated in FIGS. 11 and 12. The third surface 100 of the abutment ring 78 includes surface portions 100' that are exposed within the sprocket engaging grooves 82 between the sprocket attachment splines 80, as shown in FIG. 14. In other words, the surface portions 100' of the third surface 100 of the abutment ring 78 are exposed between the projections 88 as viewed along the sprocket engaging grooves 82. As is indicated in FIGS. 11 and 12, the first surfaces 90 and third surface 100 are perpendicular with respect to the rotation axis A.

The abutment ring 78 is fixed on the second portion 96 of the main body 74 by any of a variety of attachment configurations. For example, the abutment ring 78 can be press-fitted to the second portion 96 of the main body 74 such that the circular bore 102 of the abutment ring 78 is forced on to the main body 74 in a press-fit engagement. Alternatively, the abutment ring 78 can be rotatably disposed on the main body 74. Specifically, the abutment ring 78 can be loosely fitted on the main body 74 and retained by a conventional C-clip (not shown). As well, the abutment ring 78 can also be loosely fitted on the main body 74 and retained within a recess (not shown) formed in the second portion 96 of the main body 74. In this configuration, the abutment ring 78 is forced over the second portion 96 but is loosely disposed with the recess (not shown). In other words, the abutment ring 78 can be disposed on the second portion 96 of the main body 74 by any of a variety of mechanical retaining configurations that retain the abutment ring 78 in position adjacent to the second surfaces 92 of the projections 88. It should be understood from the drawings and the description herein that the abutment ring 78 can be loosely installed to the main body 74, as long as the abutment ring 78 is provided with sufficient restraint against movement in the second axial direction $A_2$ when fully installed.

Figure 16:
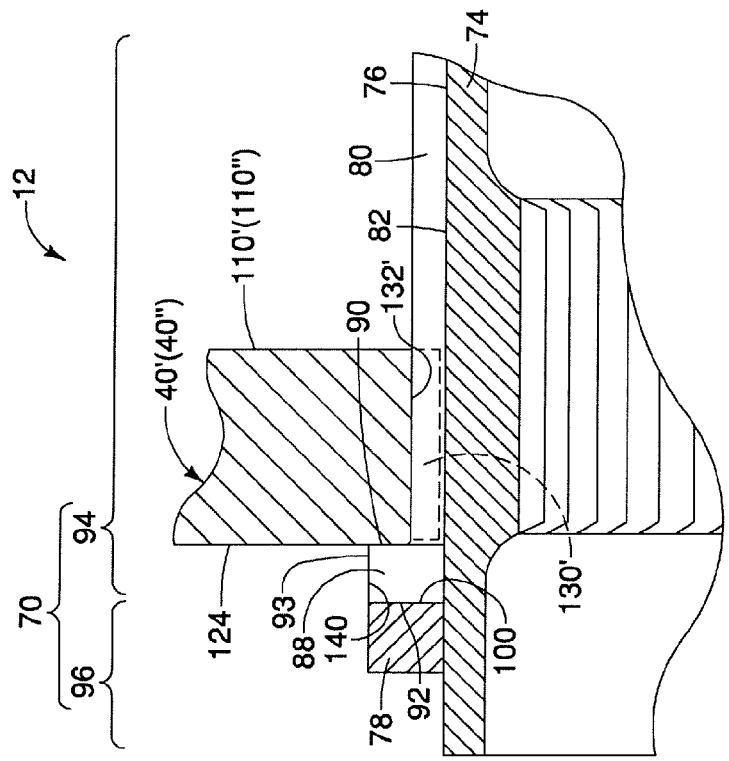
FIG. 16 is a fragmentary cross-sectional view of a portion of the freewheel outer showing engagement between the freewheel outer and a spider of the sprocket cassette with ten (10) sprockets in accordance with the one embodiment.
Figure 15:
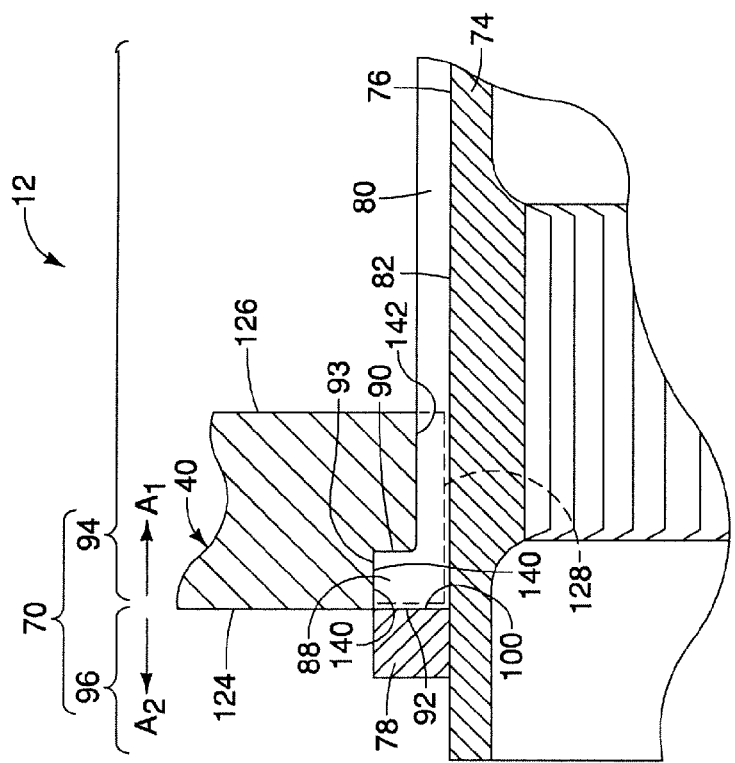
FIG. 15 is a fragmentary cross-sectional view of a portion of the freewheel outer showing engagement between the freewheel outer and a first sprocket support member of the sprocket cassette with eleven (11) sprockets of the sprocket support structure in accordance with the one embodiment.

FIGS. 15 and 16 depict the freewheel outer 70 and the positioning of each of the sprocket cassette 40 (FIG. 15) and the sprocket cassettes 40' and 40" (FIG. 16). Specifically, in FIG. 15, the sprocket cassette 40 is restrained against movement in the second axial direction $A_2$ by contact between the sprocket cassette 40 and the third surface 100 of the abutment ring 78. In FIG. 16, the sprocket cassettes 40' and 40" are restrained against movement in the second axial direction $A_2$ by contact between the sprocket cassettes 40' and 40" and the first surface 90 of the projections 88.

In order to more fully understand the relationships between the freewheel outer 70 of the sprocket support structure 12 and the positioning the sprocket cassette 40 and the sprocket cassettes 40' and 40" relative to the freewheel outer 70, a more detailed description of the sprocket cassette 40 is provided now with specific reference to FIGS. 17 thru 20.

As shown in FIG. 17, the sprocket cassette 40 includes the eleven (11) sprocket, the first sprocket $S_1$ thru the eleventh sprocket $S_{11}$. The sprocket cassette 40 also includes a first sprocket support member 110, a second sprocket support member 112, spacers 114, 116 and 118 and the locking ring 44. The first sprocket support member 110 and the second sprocket support member 112 are often referred to as spiders.

As best shown in FIGS. 18 and 19, the first sprocket support member 110 including a freewheel engaging portion 120 and sprocket attachment portions 122. The freewheel engaging portion 120 including a first end face 124, a second end face 126 and a circumferentially extending inner surface 128 extending between the first end face 124 and the second end face 126. As indicated in FIG. 15, while the first sprocket support member 110 is in a fully installed position on the main body 74, the inner surface 128 overlays the projections 88 of the first portion 94 of the main body 74 of the freewheel outer 70 and the first end face 124 of the freewheel engaging portion 120 abuts the second surface 100 of the abutment ring 78.

Figure 20:
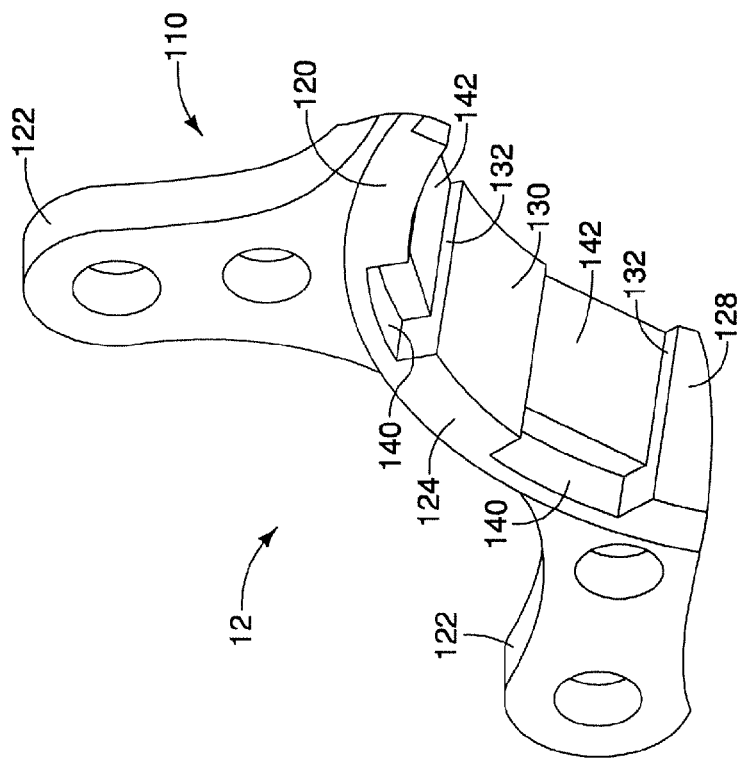
FIG. 20 is a fragmentary perspective view of the first sprocket showing the inner slots having recesses dimensioned to receive corresponding projections of the freewheel outer in accordance with the one embodiment.

As indicated in FIGS. 18 and 20, the inner surface 128 includes a plurality of inner splines 130 defining a plurality of inner slots 132 between the inner splines 130. As indicated in FIG. 15, while the first sprocket support member 110 is in a fully installed position on the main body 74, the inner splines 130 are disposed in the sprocket engaging grooves 82 of the main body 74 and at least a portion of each of the sprocket attachment splines 80 of the main body 74 are disposed in the inner slots 132. Consequently, the inner surface 128 is non-rotatably engaged with the projections 88 and the main body 74 of the freewheel outer 70.

As best shown in FIGS. 18 thru 20, the inner slots 132 are stepped in a radial direction with respect to the rotation axis A to define first recessed sections 140 and second recessed sections 142. The first recessed sections 140 are spaced apart from the rotation axis A by a radius $r_1$ and the second recessed sections 142 are spaced apart from the rotation axis A by a radius $r_2$. The radius $r_1$ is greater than the radius $r_2$. As best shown in FIG. 15, the first recessed sections 140 overly the projections 88 and the second recessed sections 142 overly the sprocket attachment splines 80 while the first sprocket support member 110 is in the fully installed position on the main body 74. The radius $r_1$ of the inner slots 132 is further away from the rotation axis than the outermost surfaces 93 of the projections 88.

As best shown in FIG. 18, the sprocket attachment portions 122 extend radially outward from the freewheel engaging portion 120 of the first sprocket support member 110. The first, second and third sprockets $S_1$, $S_2$ and $S_3$ are attached to the sprocket attachment portions 122 in a conventional manner.

As best shown in FIG. 19, the second sprocket support member 112 is a conventional sprocket support member 112 that includes an inner surface 150 with a plurality of inner splines 152 and a plurality of inner slots 154 defined between the inner splines 152. While the second sprocket support member 112 is in the fully installed position on the main body 74, the inner splines 152 are disposed in the sprocket engaging grooves 82 of the main body 74 and the sprocket attachment splines 80 of the main body 74 are disposed in the inner slots 154. The inner slots 154 are spaced apart from the rotation axis A by the radius $r_2$. The fourth and fifth third sprockets $S_4$ and $S_5$ are attached to the sprocket attachment portions 122 in a conventional manner.

The inclusion of the first recessed sections 140 of the inner slots 132 of the freewheel engaging portion 120 of the first sprocket member 110 provides clearance so that the projections 88 of the main body 74 do not interfere with the installation of the sprocket cassette 40 on to the freewheel outer 70 (the sprocket support structure) of the hub assembly 42. More specifically, the dimensions of the inner slot 132 are such that the first end face 124 can contact the third surface 100 of the abutment ring 78. Thus, the sprocket cassette 40 with eleven (11) sprockets can be retained on the freewheel outer 70. The inclusion of the first recessed sections 140 of the inner slots 132 also allows for the overall length L1 of the sprocket cassette 40 to fit on the hub assembly 42.

Hence, the abutment ring 78 provides a stop surface (the third surface 100) that ensures proper positioning of the sprocket cassette 40 on the hub assembly 42.

In contrast, the sprocket cassette 40' includes a conventional first sprocket support member 110' and the sprocket cassette 40" includes a conventional first sprocket support member 110", as indicated in FIG. 16. More specifically, the conventional first sprocket support members 110' and 110" have conventional inner splines 130' and inner slots 132', where the inner slots 132' do not include the recessed sections 140. Consequently, the conventional first sprocket support members 110' and 110" abut the first surfaces 90 of the projections 88 while either of the sprocket cassette 40' and the sprocket cassette 40" are fully installed on the hub assembly 42.

The first surfaces 90 of the projections 88 and the third surface 100 of the abutment ring 78 provide two separate axially spaced apart stop surfaces that provide the hub assembly 42 with greater flexibility with respect to installation of differing combinations of sprocket cassettes.

Second Embodiment

Referring now to FIGS. 21 thru 24, a sprocket support structure 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the sprocket support structure 12' includes the freewheel outer 70 including all features of the freewheel outer 70 described above with respect to the first embodiment. In the second embodiment, the first sprocket support member 110 of the first embodiment has been replaced with the first sprocket support member 210, as described below. Otherwise, all the features of the first embodiment described above are the same in the second embodiment.

The first sprocket support member 210 includes the sprocket attachment portions 122 and a freewheel engaging portion 220. The freewheel engaging portion 220 includes the first end face 124, the second end face 126, an inner surface 228, a plurality of inner splines 230 and a plurality of inner slots 232. The inner splines 230 and the inner slots 232 extend uninterrupted between the first end face 124 and the second end face 126. The inner slots 232 are uniform from end to end and include root surfaces 244. The root surfaces are spaced apart from the rotation axis A by the radius $r_1$.

Figure 23:
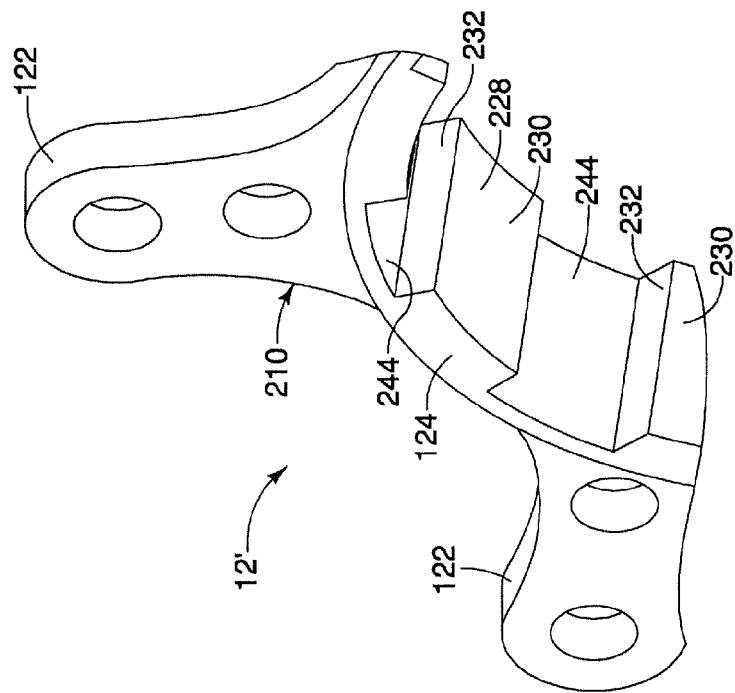
FIG. 23 is a fragmentary perspective view of the first sprocket depicted in FIGS. 21 and 22 showing the inner slots in accordance with the second embodiment of the first sprocket support member.
Figure 22:
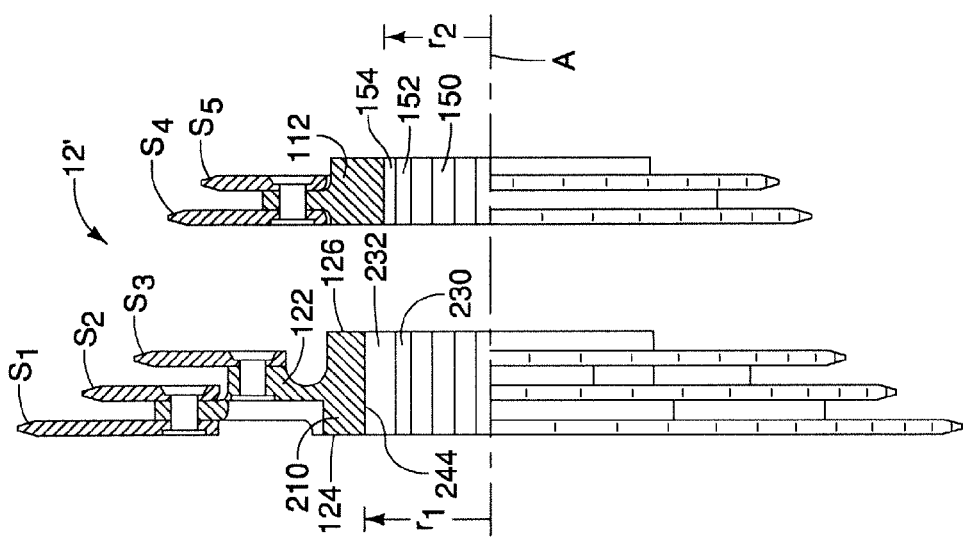
FIG. 22 is a cross-sectional view of the first sprocket support member and a second sprocket support member of the sprocket cassette with eleven (11) sprockets showing inner slots of the freewheel engaging portions of the first sprocket support member and the second sprocket support member in accordance with the second embodiment of the sprocket support structure.
Figure 24:
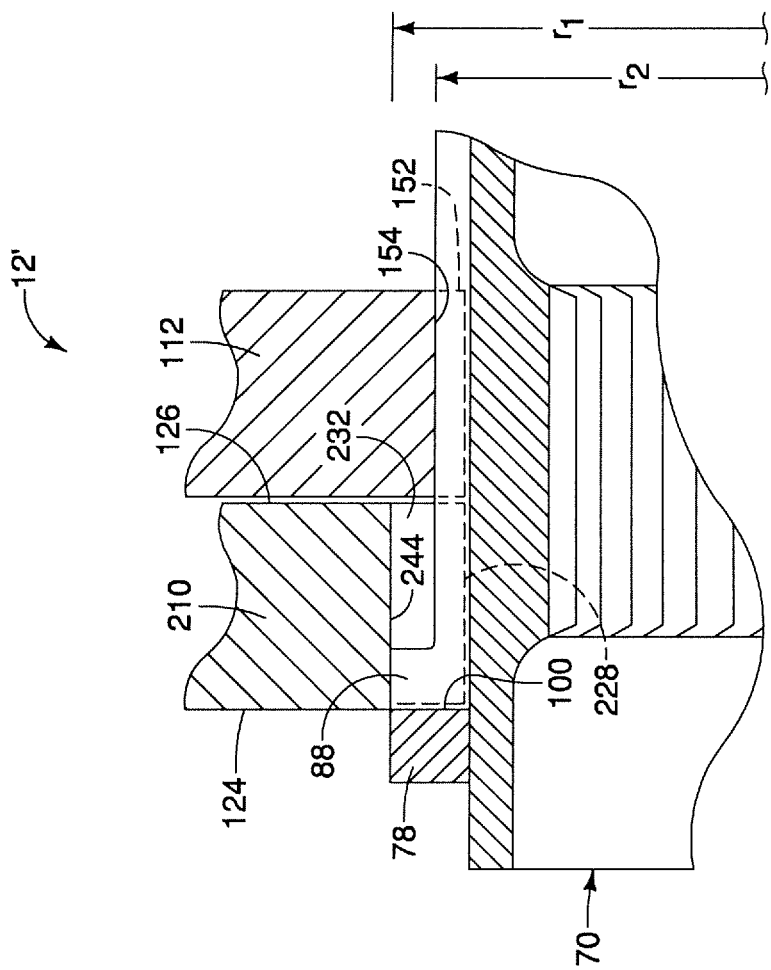
FIG. 24 is a fragmentary cross-sectional view of a portion of the freewheel outer depicted in FIGS. 9-14 and the first and second sprocket support members depicted in FIG. 22, showing engagement between the freewheel outer and the first and second sprocket support members of the sprocket support structure in accordance with the second embodiment.

In contrast, the second sprocket support member 112 has the inner slots 154 that are spaced apart from the rotation axis A by the radius $r_2$, as shown in FIGS. 23 and 25. More specifically, as best shown in FIG. 22, the root surfaces 244 of the inner slots 232 extend in directions parallel to the rotation axis A from the first end face 124 to the second end face 126. As best shown in FIG. 24, the root surfaces 244 are entirely further from the rotation axis A than the outermost surface 93 of the projections 88, while the first sprocket support member 210 is in the fully installed position on the main body 70.

Alternate Embodiments

In further alternate embodiments, the abutment ring 78 and the second portion 96 of the main body 74 can be integrally formed as a single unitary monolithic element that is a separate member from the first portion 94 of the main body 74. In other words the main body 74 can be formed as two separate elements with a first portion having all the features of the first portion 94 of the main body 74 and a second portion having all the features of the second portion 96 of the main body 74. In one such alternate embodiment, the first portion can include internal threads and the second portion can include external threads formed on a flange that is threaded into the first portion. In another alternative embodiment, the second portion can be provided with a plurality of axially extending projections that mate with corresponding recesses in the first portion. Still further, in another such alternate embodiment, the second portion can have inner splines and recesses that mate with the recesses and splines of the first portion of the main body. In other words, in embodiments where the first portion 94 and the second portion 96 of the main body 74 are formed as separate-able elements, any of a variety of mechanical attachment configurations can be employed for fixing the second portion to the first portion.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the sprocket support structure. Accordingly, these terms, as utilized to describe the sprocket support structure should be interpreted relative to a bicycle equipped with the sprocket support structure as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A sprocket support structure comprising:
a main body including an outer surface with a plurality of parallel extending sprocket attachment splines defining a plurality of sprocket engaging grooves between the sprocket attachment splines;
a plurality of projections extending radially outward farther than the sprocket attachment splines with respect to a rotation axis of the main body, each of the projections including a first surface that faces in a first axial direction of the main body and is configured and arranged to provide a first stop surface for a first sprocket support member; and
an abutment ring being disposed on the main body as a separate member from the main body, the abutment ring including a second surface facing in the first axial direction and axially spaced from the first surfaces of the projections with respect to the rotation axis, the second surface of the abutment ring being exposed between the projections as viewed along the sprocket engaging grooves and configured and arranged to provide a second stop surface for a second sprocket support member.

2. The sprocket support structure according to claim 1, wherein
the abutment ring is a continuous annular member with a circular bore.

3. The sprocket support structure according to claim 1, wherein
the first and second surfaces are perpendicular with respect to the rotation axis.

4. The sprocket support structure according to claim 1, wherein
the abutment ring is rotatably disposed on the main body.

5. The sprocket support structure according to claim 1, wherein
the abutment ring is fixed on the main body.

6. A sprocket support structure comprising:
a main body including an outer surface with a plurality of parallel extending sprocket attachment splines defining a plurality of sprocket engaging grooves between the sprocket attachment splines;
a plurality of projections extending radially outward farther than the sprocket attachment splines with respect to a rotation axis of the main body, each of the projections including a first surface facing in a first axial direction of the main body;
an abutment ring being disposed on the main body as a separate member from the main body, the abutment ring including a second surface facing in the first axial direction and axially spaced from the first surfaces of the projections with respect to the rotation axis, the second surface of the abutment ring being exposed between the projections as viewed along the sprocket engaging grooves; and
a sprocket support member including a freewheel engaging portion and a sprocket attachment portion, the freewheel engaging portion including a first end face, a second end face and a circumferentially extending inner surface extending between the first and second end faces, the inner surface overlying the projections and the first end face abutting the second surface of the abutment ring while the sprocket support member is in a fully installed position on the main body.

7. The sprocket support structure according to claim 6, wherein
the inner surface is non-rotatably engaged with the projections.

8. The sprocket support structure according to claim 6, wherein
the inner surface includes a plurality of inner splines defining a plurality of inner slots between the inner splines, the inner splines being disposed in the sprocket engaging grooves of the main body and at least a portion of each of the sprocket attachment splines of the main body being disposed in the inner slots.

9. The sprocket support structure according to claim 8, wherein
the inner slots are stepped in a radial direction with respect to the rotation axis to define first and second recessed sections, the first recessed sections overlying the projections and the second recessed sections overlying the sprocket attachment splines while the sprocket support member is in the fully installed position on the main body.

10. The sprocket support structure according to claim 8, wherein
each of the inner slots includes a root surface that extends in a direction parallel to the rotation axis from the first end face to the second end face, the root surface being entirely further from the rotation axis than an outermost surface of the projections, while the sprocket support member is in the fully installed position on the main body.

11. A bicycle hub comprising:
a hub axle;
a hub body rotatably disposed on the hub axle; and
a sprocket support structure rotatably disposed on the hub axle for rotation with the hub body in one direction about the hub axle, the sprocket support structure including
a main body including an outer surface with a plurality of parallel extending sprocket attachment splines defining a plurality of sprocket engaging grooves between the sprocket attachment splines,
a plurality of projections extending radially outward farther than the sprocket attachment splines with respect to a rotation axis of the main body, each of the projections including a first surface that faces in a first axial direction of the main body and is configured and arranged to provide a first stop surface for a first sprocket support member, and
an abutment ring being disposed on the main body as a separate member from the main body, the abutment ring including a second surface facing in a first axial direction with respect to the rotation axis and axially spaced from the first surfaces of the projections with respect to the rotation axis, the second surface of the abutment ring being exposed between the projections as viewed along the sprocket engaging grooves and configured and arranged to provide a second stop surface for a second sprocket support member.

12. The bicycle hub according to claim 11, wherein
the abutment ring is a continuous annular member with a circular bore.

13. The bicycle hub according to claim 11, wherein
the first and second surfaces are perpendicular with respect to the rotation axis.

14. The bicycle hub according to claim 11, wherein
the abutment ring is rotatably disposed on the main body.

15. The bicycle hub according to claim 11, wherein
the abutment ring is fixed on the main body.

16. A bicycle hub comprising:
a hub axle;
a hub body rotatably disposed on the hub axle;
a sprocket support structure rotatably disposed on the hub axle for rotation with the hub body in one direction about the hub axle, the sprocket support structure including
a main body including an outer surface with a plurality of parallel extending sprocket attachment splines defining a plurality of sprocket engaging grooves between the sprocket attachment splines,
a plurality of projections extending radially outward farther than the sprocket attachment splines with respect to a rotation axis of the main body, each of the projections including a first surface facing in a first axial direction of the main body,
an abutment ring being disposed on the main body as a separate member from the main body, the abutment ring including a second surface facing in a first axial direction with respect to the rotation axis and axially spaced from the first surfaces of the projections with respect to the rotation axis, the second surface of the abutment ring being exposed between the projections as viewed along the sprocket engaging grooves, and
a sprocket support member including a freewheel engaging portion and a sprocket attachment portion, the freewheel engaging portion including a first end face, a second end face and a circumferentially extending inner surface extending between the first and second end faces, the inner surface overlying the projections and the first end face abutting the second surface of the abutment ring while the sprocket support member is in a fully installed position on the main body.

17. The bicycle hub according to claim 16, wherein
the inner surface is non-rotatably engaged with the projections.

18. The bicycle hub according to claim 16, wherein
the inner surface includes a plurality of inner splines defining a plurality of inner slots between the inner splines, the inner splines being disposed in the sprocket engaging grooves of the main body and at least a portion of each of the sprocket attachment splines of the main body being disposed in the inner slots.

19. The bicycle hub according to claim 18, wherein
the inner slots are stepped in a radial direction with respect to the rotation axis to define first and second recessed sections, the first recessed sections overlying the projections and the second recessed sections overlying the sprocket attachment splines while the sprocket support member is in the fully installed position on the main body.

20. The bicycle hub according to claim 18, wherein
each of the inner slots includes a root surface that extends in a direction parallel to the rotation axis from the first end face to the second end face, the root surface being entirety further from the rotation axis than an outermost surface of the projections, while the sprocket support member is in the fully installed position on the main body.

21. The bicycle hub according to claim 18, wherein
at least one sprocket attached to the sprocket attachment portion of the sprocket support member.

\* \* \* \* \*